(12) United States Patent
Labbe

(10) Patent No.: US 11,689,046 B2
(45) Date of Patent: Jun. 27, 2023

(54) DEVICE FOR SUPPLYING POWER TO AN ELECTRICAL MACHINE OF A MOTOR VEHICLE

(71) Applicant: Valeo Equipements Electriques Moteur, Creteil (FR)

(72) Inventor: Nicolas Labbe, St Quentin Fallavier (FR)

(73) Assignee: Valeo Equipements Electriques Moteur, Creteil (FR)

( * ) Notice: Subject to any disclaimer, the term of this patent is extended or adjusted under 35 U.S.C. 154(b) by 424 days.

(21) Appl. No.: 17/050,936

(22) PCT Filed: Apr. 3, 2019

(86) PCT No.: PCT/FR2019/050776
§ 371 (c)(1),
(2) Date: Oct. 27, 2020

(87) PCT Pub. No.: WO2019/207226
PCT Pub. Date: Oct. 31, 2019

(65) Prior Publication Data
US 2021/0242710 A1 Aug. 5, 2021

(30) Foreign Application Priority Data
Apr. 27, 2018 (FR) ...................................... 1853741

(51) Int. Cl.
*H02J 7/00* (2006.01)
*H02J 7/34* (2006.01)

(52) U.S. Cl.
CPC ............ *H02J 7/345* (2013.01); *H02J 7/0014* (2013.01); *H02J 7/00711* (2020.01); *H02J 2310/48* (2020.01)

(58) Field of Classification Search
CPC .................................................. H02J 7/0068
(Continued)

(56) References Cited

U.S. PATENT DOCUMENTS

2008/0030165 A1* 2/2008 Lisac .................... H02M 3/158
320/167
2008/0055946 A1* 3/2008 Lesso ................ H02M 3/33561
363/63
(Continued)

FOREIGN PATENT DOCUMENTS

FR 2996374 A1 4/2014
WO 99/14837 A1 3/1999

OTHER PUBLICATIONS

International Search Report and Written Opinion corresponding to International Application No. PCT/FR2019/050776, dated Jun. 24, 2019 (14 pages).

*Primary Examiner* — Yalkew Fantu
(74) *Attorney, Agent, or Firm* — Osha Bergman Watanabe & Burton LLP

(57) ABSTRACT

The present invention relates to a device (10) for powering a rotating electrical machine (13) of a motor vehicle, comprising: —an amplifier (15) capable of being electrically powered by the first electrical energy storage unit (11) and capable of electrically powering the second electrical energy storage unit (12), characterised in that the amplifier (15) comprises an oscillating circuit (16), the oscillating circuit (16) comprising a capacitance (C) of value C' and an inductive assembly comprising an inductance (L) of value L' and a resistance (R) of value R', —the oscillating circuit (16) having a specific angular frequency ω such that $\omega = 1/\sqrt{L' \times C'}$) and a natural frequency f such that $f = \omega(2\pi)$, and in that the value of the inductance (L) is variable in a predetermined manner, in particular so as to increase an electric current, supplied by the first electrical energy storage unit (11) to the oscillating circuit (16), into an amplified current supplied by the oscillating circuit (16) to the second electrical energy storage unit (12).

15 Claims, 3 Drawing Sheets

(58) Field of Classification Search
USPC .......................................................... 320/103
See application file for complete search history.

(56) References Cited

U.S. PATENT DOCUMENTS

| | | | |
|---|---|---|---|
| 2014/0210398 A1* | 7/2014 | Powell | B60L 53/20 |
| | | | 320/104 |
| 2014/0340022 A1 | 11/2014 | Kang et al. | |
| 2018/0022300 A1* | 1/2018 | Labbe | F02N 11/087 |
| | | | 307/10.1 |

* cited by examiner

DEVICE FOR SUPPLYING POWER TO AN ELECTRICAL MACHINE OF A MOTOR VEHICLE

The present invention relates to a device for supplying power to an electrical machine of a motor vehicle.

In a known manner, an electrical distribution network of a motor vehicle generally comprises a battery which is connected to the on-board network of the vehicle in order to supply the equipment of the vehicle with electricity. An alternator transforms part of the mechanical energy of the thermal engine into electrical energy in order to recharge the battery.

Amongst the equipment of the on-board network, there are firstly low-power components and secondly at least one high-power component. A high-power component of this type can be a starter, or also an electric traction motor.

The problem with this type of energy distribution network consists in the fact that during transitory phases of activation, the power supply to the high-power component gives rise to a very high demand for current, in particular in relation to the level reached subsequently when the engine is running and is operating at its normal speed, with its electromotive force, or "induced rotation voltage" opposing the demand for current. A significant voltage drop thus develops at the battery. As a result of this voltage drop, the other components, often comprising control electronics which require a sufficiently high level of voltage, may no longer be supplied with sufficient voltage for their satisfactory operation. In addition, the repeated high demands for current tend to reduce the service life of the battery.

Another problem with this type of distribution network consists in the fact that the battery must be designed so as to make it possible to provide both good energy density, to supply a low current of a few amps to the minor consumers for several hours, and good power density, to supply a high current of several hundred amps to the major consumers for a few tens of seconds or even a few minutes, including at a low temperature such as −25° C. for example, which is incompatible and requires a compromise to be made, in particular concerning the number of plates of battery elements in contact with the electrolyte, and the surface and thickness of the plates, needed to obtain a limited total size. Lead batteries have been used to obtain this compromise, but they have the disadvantage of having a large mass, for a performance characteristic which can be neither maximal in terms of energy density nor maximal in terms of power density.

The objective of the invention is to eliminate these disadvantages at least partly by proposing a device for supplying power to a rotary electrical machine of a motor vehicle comprising:

- a first electrical energy storage unit, which in particular is designed to supply power to an on-board network of the motor vehicle;
- a second electrical energy storage unit, which in particular is designed to supply power to the rotary electrical machine;
- an amplifier which can be supplied electrically by the first electrical energy storage unit, and can supply the second electrical energy storage unit electrically, characterised in that the amplifier comprises an oscillating circuit 16, the oscillating circuit comprising a capacitor with a value C' and an inductive assembly comprising an inductance with a value L' and a resistor with a value R';

the oscillating circuit having its own pulsation $\omega$ such that $\omega=1/\sqrt{(L' \times C')}$ and its own frequency f such that $f=\omega/(2\Pi)$, and in that the value of the inductance is variable in a predetermined manner, in particular such as to increase an electric current supplied by the first electrical energy storage unit to the oscillating circuit into an amplified current supplied by the oscillating circuit to the second electrical energy storage unit.

Because of the use of the amplifier, which is supplied with power by the first electrical energy storage unit and is designed to charge the second electrical energy storage unit, the invention thus makes it possible to avoid any substantial demand for current at the first electrical energy storage unit. By means of the use of two electrical energy storage units which are of a different type and are situated on two separate circuits, the invention also makes it possible to eliminate the compromise associated with the design of the battery of a motor vehicle resulting in not being able to obtain either a maximal energy density nor a maximal power density.

According to one embodiment, the inductance value L' varies according to a predetermined frequency and according to a predetermined amplitude of variation of inductance around a mean value Lmoy, such that the square of the own pulsation varies according to a predetermined amplitude of variation of pulsation around a mean value equal to $(\omega moy)^2$, where $\omega moy = 1/\sqrt{(Lmoy \times C')}$.

According to one embodiment, the predetermined frequency is selected such as to increase the amplitude of the electric current circulating in the oscillating circuit exponentially.

According to one embodiment, the predetermined frequency is equal to a mean own frequency of the oscillating circuit to within a tolerance $\epsilon$, the mean own frequency fmoy being equal to $\omega moy/(2\Pi)$.

According to one embodiment, the tolerance E is such that $\epsilon = \sqrt{((1/2) \times h \times \omega moy)^2 - (R'/L')^2)}$, the predetermined amplitude of variation of pulsation being equal to $h \times (\omega moy)^2$ and h being a number, the absolute value of which is strictly less than 1.

According to one embodiment, h is strictly greater than zero.

According to one embodiment, the predetermined amplitude of variation of pulsation is strictly greater than $2 \times (R'/L') \times \sqrt{(L' \times C')}$.

According to one embodiment, the capacitor has a constant capacity value.

According to one embodiment, the first electrical energy storage unit is of the battery type which can supply a low intensity for a long period, for example 100 Ah, and the second electrical energy storage unit is of the supercapacitor type which can supply a high intensity for a shorter period, or a battery with dynamic characteristics close to those of a supercapacitor.

According to one embodiment, the first and second electrical energy storage units are distinct.

According to one embodiment, the first electrical energy storage unit has an energy density, expressed in Wh/kg, which is greater than that of the second electrical energy storage unit, for example more than twice that of the second electrical energy storage unit, in particular more than 10 times that of the second electrical energy storage unit.

According to one embodiment, the second electrical energy storage unit has a power density, expressed in W/kg, which is greater than that of the first electrical energy storage unit, for example more than twice that of the first electrical energy storage unit, in particular more than 10 times that of the first electrical energy storage unit.

According to one embodiment, the inductor is formed by an assembly with variable inductive reluctance comprising:
- a stator comprising a plurality of poles formed by a plurality of coils each disposed around a corresponding polar part; and
- a rotor formed by a set of magnetic metal plates provided with projections of the same number as the poles of the stator.

According to one embodiment, the coils are connected in series to one another.

According to one embodiment, the coils of two adjacent poles are wound in the inverse direction to one another such that there is an alternation of north poles and south poles around a circumference of the stator.

According to one embodiment, the amplifier comprises an electric motor comprising a shaft which is coupled to the rotor to rotate the rotor of the assembly with variable inductive reluctance.

The invention will be better understood by reading the following description and examining the figures which accompany it. These figures are provided purely by way of illustration, and in no way limit the invention.

FIG. 1b is a graphic representation of the development on a time basis of the current in the oscillating circuit, of the current supplied by the supercapacitor, and of the current circulating in the pumping motor during activation of the supply device in FIG. 1a;

FIG. 2b is a graphic representation of the development on a time basis of the current in the oscillating circuit, of the current supplied by the supercapacitor, and of the current circulating in the pumping motor during activation of the supply device in FIG. 2a;

Elements which are identical, similar or analogous retain the same references from one figure to another.

Figure 1A:
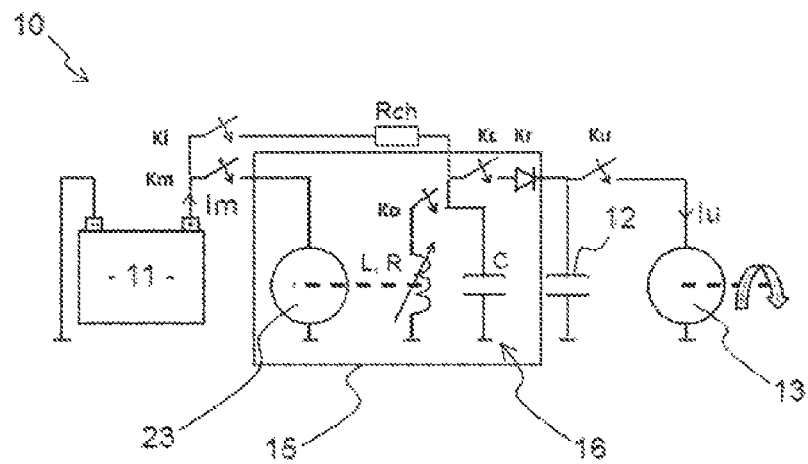
FIG. 1a is a schematic representation illustrating a supply device according to the invention supplying power to a starter of a thermal engine.
Figure 2A:
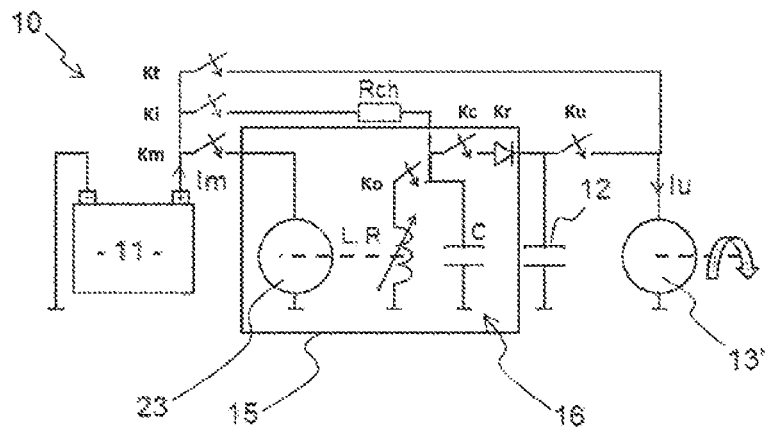
FIG. 2a is a schematic representation illustrating a supply device according to the invention supplying power to an electric traction motor of a motor vehicle.

FIGS. 1a and 2a show a supply device 10 according to the invention comprising a first electrical energy storage unit 11 which is designed to supply with electricity the electrical consumers of an on-board network of a motor vehicle.

Figure 1B:
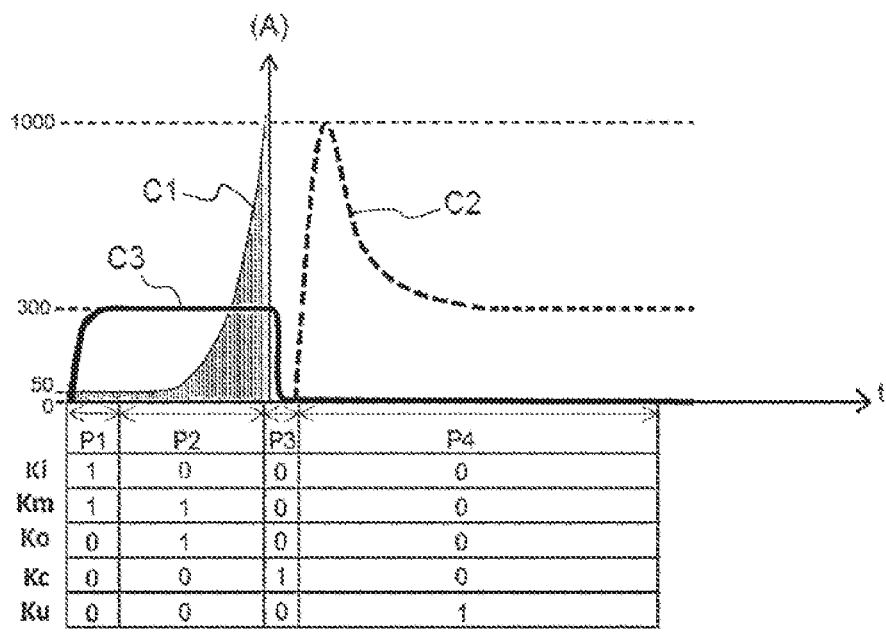

A second electrical energy storage unit 12 is designed to supply power to a high-power component 13, 13' which can take the form of a starter (cf. FIG. 1a) or an electric traction motor (cf. FIG. 1b).

The first energy storage unit 11 is of the battery type which can supply a low intensity for a long period, for example 100 Ah, whereas the second energy storage unit 12 is of the supercapacitor type which can supply a high intensity for a shorter period, for example an intensity of approximately 800 to 1000 A for a period of less than 50 ms, or a battery with dynamic characteristics which are close to those of a supercapacitor. The storage units 11 and 12 are advantageously distinct. As a variant, the storage units 11 and 12 can be integrated within a single housing.

The first energy storage unit 11 and the second energy storage unit 12 can be called more simply respectively the "battery" and "supercapacitor" hereinafter in the description.

Advantageously, the battery 11 has an energy density, expressed in Wh/kg, which is greater than that of the supercapacitor 12, for example more than twice that of the supercapacitor 12, in particular more than 10 times that of the supercapacitor 12.

The supercapacitor 12 has a power density, expressed in W/kg, which is greater than that of the battery 11, for example more than twice that of the battery 11, in particular more than 10 times that of the battery 11.

An amplifier 15 is interposed between the battery 11 and the supercapacitor 12. The amplifier 15 is supplied electrically by the battery 11, and supplies the supercapacitor 12 electrically.

The amplifier 15 comprises an oscillating circuit 16 formed by a capacitor C with a value C' and an inductive assembly comprising an inductance L with a value L' and a resistor R with a value R. The resistor R can partly belong to the capacitor C in addition to the inductive assembly.

The oscillating circuit 16 has an own pulsation $\omega$ such that $\omega=1/(L'\times C')$ and an own frequency f such that $f=\omega/(2\Pi)$.

Advantageously, the capacitor C has a constant capacity value, whereas the value of the inductance L is variable in a predetermined manner, in particular such as to increase an electric current supplied by the battery 11 to the oscillating circuit 16 into an amplified current supplied by the oscillating circuit 16 to the supercapacitor 12.

The value L' of the inductance L varies according to a predetermined frequency and according to a predetermined amplitude of variation of inductance around a mean value Lmoy, such that the square of the own pulsation varies according to a predetermined amplitude of variation of pulsation around a mean value equal to $(\omega moy)^2$, where $\omega moy=1/\sqrt{(Lmoy \times C')}$. The predetermined frequency is selected such as to increase the amplitude of the electric current circulating in the oscillating circuit 16 exponentially.

The predetermined frequency is advantageously equal to twice the mean own frequency of the oscillating circuit 16 to within a tolerance $\varepsilon$, the mean own frequency being equal to $\omega moy/(2\varnothing)$.

The predetermined amplitude of variation of pulsation is equal to $h \times (\omega moy)^2$, h being a number strictly greater than zero, and strictly less than 1.

The tolerance is such that $\varepsilon=\sqrt{(((1/2) \times h \times \omega moy)^2-(R'/L')^2)}$.

The predetermined amplitude of variation of pulsation is strictly greater than $2 \times (R'/L') \times \sqrt{(L' \times C')}$.

The amplifier 15 additionally comprises a diode Kr to supply a one-way current to the supercapacitor 12.

Figure 3:
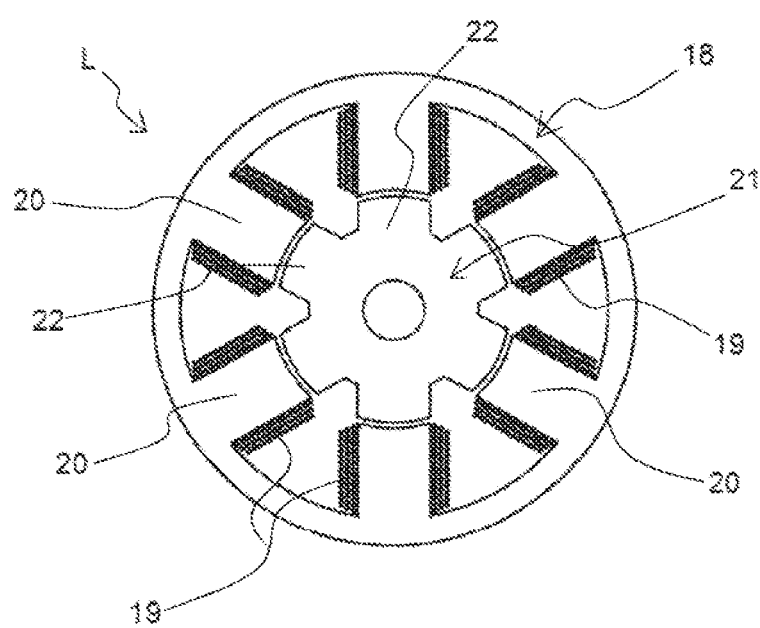
FIG. 3 is a schematic representation of an inductor, in the form of an assembly with variable inductive reluctance, used in the supply device according to the present invention.

As can be seen in FIG. 3, the inductor L is advantageously formed by an assembly with variable inductive reluctance comprising a stator 18 comprising a plurality of poles formed by a plurality of coils 19 each disposed around a corresponding polar part 20. The stator 18 surrounds coaxially a rotor 21 formed by a set of magnetic metal plates provided with projections 22 of the same number as the poles of the stator 18. In the example in FIG. 3, the stator comprises 6 projections alternating north to south. The assembly with variable inductive reluctance thus comprises 3 pairs of poles both on the rotor and on the stator.

The coils 19 are advantageously connected in series to one another.

The coils 19 of two adjacent poles are wound in the inverse direction to one another, such that there is alternation of north poles N and south poles S around a circumference of the stator 18.

A pumping motor 23 rotates the rotor 21. This pumping motor 23 is for example an electric motor of the servomotor type with constant speed. For this purpose, the pumping motor 23 comprises a shaft which is coupled to the rotor 21 in order to rotate the rotor 21 of the assembly with variable inductive reluctance. The pumping motor 23 is supplied electrically by the battery 11. The speed of rotation of the pumping motor 23 is controlled in order to produce the predetermined frequency required. In a steady state, this speed of rotation will be for example approximately 40,000 rpm.

The capacitor C of the oscillating circuit 16 is for example a capacitor made from polypropylene, in particular of at least 5 mF.

The assembly with variable inductive reluctance has dimensions for example such that the mean inductance value Lmoy is 5 μH.

Thus, the own frequency of the oscillating circuit 16 will be approximately 1 kHz.

With three pairs of poles, a speed of rotation of 40,000 rpm of this type makes it possible to provide a frequency of variation of the value of the inductance L' of approximately 2 kHz, i.e. twice the own frequency of the oscillating circuit.

The supply device 10 also comprises a plurality of switches Ki, Km, Ko, Kc, Kr, Ku. These switches can be in the form of an electronic switch based on transistors.

The switch Ki controls the switching on of the capacitor C of the oscillating circuit 16.

The switch Km controls the switching on of the pumping motor 23.

The switch Ko controls the putting into operation of the oscillating circuit 16.

The switch Kc controls the transfer of energy from the oscillating circuit 16 to the supercapacitor 12 via a rectifier bridge represented by the switch Kr.

The switch Ku controls the transfer of energy from the supercapacitor 12 to the starter 13 of the thermal engine.

Figure 2B:
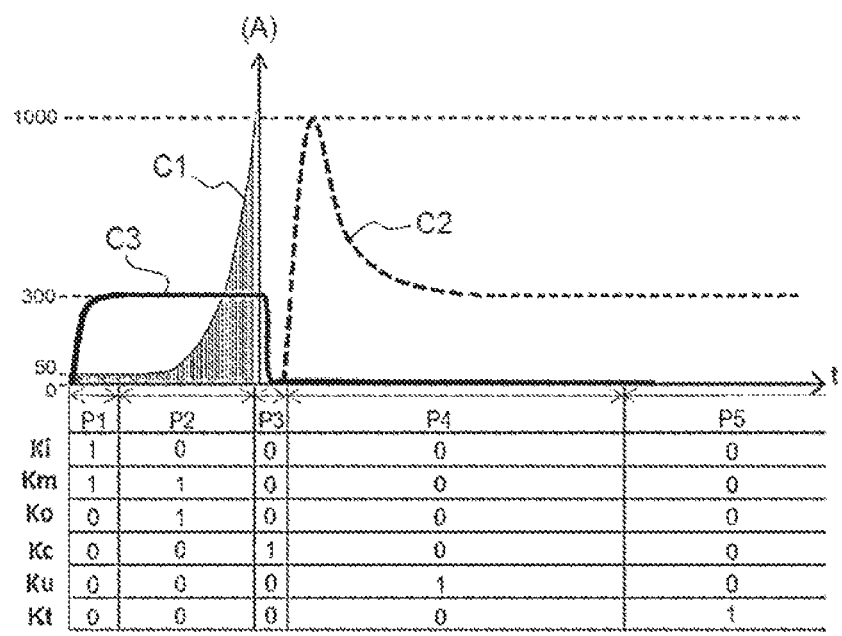

FIGS. 1b and 2b describe the development on a time basis of the currents in Amperes (A) which can be observed in the circuit during the activation of the supply device 10 according to the invention.

The curve C1 represents the temporal development of the absolute value of the current of the oscillating circuit 16. The curve C2 represents the temporal development of the current lu supplied by the supercapacitor 12 to the charge 13, 13'. The curve C3 represents the temporal development of the current lm circulating in the pumping motor 23.

Below these curbs, a table represents different operating phases (P1 to P4 FIG. 1b, and P1 to P5 for FIG. 2b). These operating phases are in relation with the curve in the direction where each phase has been represented in succession over a period of time, along the X axis. The states "0" and "1" correspond respectively to an open and closed state of the switches.

During a first phase P1, the switch Ki is closed in order to charge the capacitor C of the oscillating circuit 16 with a low current of approximately 50 A via a resistor Rch. In addition, the pumping motor 23 is put into operation in order to reach the speed, greater than 10,000 rpm, which is designed to activate the oscillating circuit 16 (cf. closure of Km). This phase P1 has a duration of between 50 ms and 100 ms.

During the second phase P2, the closure of Ko gives rise to an increase in the oscillations in the interior of the oscillating circuit 16, as a result of the variation of the value of the inductance L in the aforementioned manner. The pumping motor 23 also makes it possible to overcome the resistant torque of the assembly with variable inductive reluctance associated with the increasing amplitude current of the oscillating circuit 16 circulating in the coils 19 of the stator 18. The current lm which circulates in the pumping motor 23 is approximately 300 A. The phase P2 has a duration of between 100 ms and 200 ms.

During the third phase P3, the switch Kc is closed in order to transfer the energy accumulated in the oscillating circuit 16 to the supercapacitor 12. This phase P3 has a duration of between 50 ms and 100 ms.

During the phase P4, the closure of the switch Ku permits the supply of power to the starter 13 by the supercapacitor 12. A current spike is then observed corresponding to the demand for current by the starter, which can reach 1000 A. The amplifier 15 according to the invention thus makes it possible to dissociate the electrical circuit of the battery 11 from the electrical circuit of the starter 13, in order to prevent the demand for current from the starter 13 from disrupting the other charges of the on-board network which are connected to the battery 11. This phase P4 has a duration of between 500 ms and 1 s.

After the thermal engine has reached its speed of autonomy, the switch Ku is opened.

FIG. 2a shows a variant embodiment of the invention, according to which the supply device 10 supplies power to an electrical machine 13' in the form of a traction motor. The components of the amplifier 15 as well as its operation are analogous to those of the device in FIGS. 1a and 1b.

The difference consists in the duration of activation of the traction motor 13', which is longer than that of the starter 13. In fact, a motor 13' of this type can remain energised for several minutes, or even a few hours. Consequently, it will be possible to provide an additional switch Kt which allows the traction motor 13' to be supplied with power by the battery 11 after having been supplied with power by the supercapacitor 12 during the initial demand for current (cf. phase P5 of FIG. 2b).

It will be appreciated that the foregoing description has been provided purely by way of example, and does not limit the field of the invention, a departure from which would not be constituted by replacing the different elements by any other equivalents.

In addition, the different characteristics, variants, and/or embodiments of the present invention can be associated with one another according to various combinations, provided that they are not incompatible or mutually exclusive.

The invention claimed is:

1. A device for supplying power to a rotary electrical machine of a motor vehicle, the device comprising:
    a first electrical energy storage unit configured to supply power to an on-board network of the motor vehicle;
    a second electrical energy storage unit configured to supply power to the rotary electrical machine;
    an amplifier supplied electrically by the first electrical energy storage unit, and which in turn supplies the second electrical energy storage unit electrically,
wherein the amplifier comprises an oscillating circuit,
the oscillating circuit comprising a capacitor with a value C' and an inductive assembly comprising an inductance with a value L' and a resistor with a value R',
    the oscillating circuit having its own pulsation ω such that $\omega=1/\sqrt{(L'\times C')}$ and its own frequency f such that $f=\omega/(2\Pi)$, and
wherein the value of the inductance is variable in a predetermined manner so as to increase an electric current supplied by the first electrical energy storage unit to the oscillating circuit into an amplified current supplied by the oscillating circuit to the second electrical energy storage unit.

2. The device according to claim 1, wherein the inductance value L' varies according to a predetermined frequency and according to a predetermined amplitude of variation of inductance around a mean value Lmoy, such that the square of the own pulsation varies according to a predetermined amplitude of variation of pulsation around a mean value equal to $(\omega moy)^2$, where $\omega moy=1/\sqrt{(Lmoy \times C')}$.

3. The device according to claim 2, wherein the predetermined frequency is selected such as to increase the amplitude of the electric current circulating in the oscillating circuit exponentially.

4. The device according to claim 2, wherein the predetermined frequency is equal to twice a mean own frequency of the oscillating circuit to within a tolerance ε, the mean own frequency fmoy being equal to $\omega moy/(2\Pi)$.

5. The device according to claim 4, wherein the tolerance ε is such that $\varepsilon=\sqrt{((\frac{1}{2}) \times h \times \omega moy)^2-(R'/L')^2)}$, the predetermined amplitude of variation of pulsation being equal to $h \times (\omega moy)^2$ and h being a number, the absolute value of which is strictly less than 1.

6. The device according to claim 2, wherein the predetermined amplitude of variation of pulsation is strictly greater than $2 \times (R'/L') \times \sqrt{(L' \times C')}$.

7. The device according to claim 1, wherein the capacitor has a constant capacity value.

8. The device according to claim 1, wherein the first electrical energy storage unit is of the battery type which can supply a low intensity for a long period, for example 100 Ah, and the second electrical energy storage unit is of the supercapacitor type which can supply a high intensity for a shorter period, or a battery with dynamic characteristics close to those of a supercapacitor.

9. The device according to claim 1, wherein the first and second electrical energy storage units are distinct.

10. The device according to claim 1, wherein the first electrical energy storage unit has an energy density, expressed in Wh/kg, which is greater than that of the second electrical energy storage unit, and is more than 10 times that of the second electrical energy storage unit.

11. The device according to claim 1, wherein the second electrical energy storage unit has a power density, expressed in W/kg, which is greater than that of the first electrical energy storage unit, and is more than 10 times that of the first electrical energy storage unit.

12. The device according to claim 1, wherein the inductor is formed by an assembly with variable inductive reluctance, the assembly comprising:
    a stator comprising a plurality of poles formed by a plurality of coils each disposed around a corresponding polar part; and
    a rotor formed by a set of magnetic metal plates provided with projections of the same number as the poles of the stator.

13. The device according to claim 12, wherein the coils are connected in series to one another.

14. The device according to claim 12, wherein the coils of two adjacent poles are wound in the inverse direction to one another such that there is an alternation of north poles and south poles around a circumference of the stator.

15. The device according to claim 12, wherein the amplifier comprises an electric motor comprising a shaft which is coupled to the rotor to rotate the rotor of the assembly with variable inductive reluctance.

* * * * *